United States Patent [19]

Cooper et al.

[11] Patent Number: 4,905,274

[45] Date of Patent: Feb. 27, 1990

[54] KEY TELEPHONE MANAGEMENT SYSTEM

[75] Inventors: Bret A. Cooper, Columbus; James R. Hahn, III, Gahanna; William H. Havanas, Reynoldsburg; Mark A. Martinka, Pickerington, all of Ohio

[73] Assignees: American Telephone & Telegraph Company AT&T Bell Laboratories, Murray Hill, N.J.; American Telephone and Telegraph Company, New York, N.Y.

[21] Appl. No.: 370,955

[22] Filed: Jun. 22, 1989

[51] Int. Cl.[4] .............................................. H04M 3/22
[52] U.S. Cl. ..................................... 379/157; 379/165
[58] Field of Search ........................ 379/157, 165, 161

[56] References Cited

U.S. PATENT DOCUMENTS

| 4,196,316 | 4/1980 | McEowen et al. | 179/18 |
| 4,517,409 | 5/1985 | Nagasaki | 179/81 |
| 4,570,035 | 2/1986 | Pinede et al. | 179/99 |
| 4,595,800 | 6/1986 | Nagatomi et al. | 179/99 |
| 4,602,132 | 7/1986 | Nagatomi et al. | 179/99 |
| 4,605,825 | 8/1986 | Komuro et al. | 379/165 |
| 4,741,026 | 4/1988 | Baxter et al. | 379/20 |
| 4,763,353 | 8/1988 | Canale et al. | 379/157 |

Primary Examiner—Stafford D. Schreyer
Attorney, Agent, or Firm—Dwight A. Marshall

[57] ABSTRACT

A key telephone management controller system enabling telephone customers to control and implement changes to customer key telephone systems served by a telephone switching system. Apparatus and a method interactive with telephone customers records customer-selected key telephone button and line features and controls the telephone switching system to assign the customer-selected button and line features to telephone sets of the customer key telephone system.

18 Claims, 10 Drawing Sheets

```
                            ┌─ 601
              RING SEL CODE NOR
              CONF GROUP 11112

SET No. 62                  MESSAGE RATE Y
LINE CLASS CODE CENTREX     INTERCEPT Y
ORIGINATING EQ No. 1E3,1E4  GROUND START Y
LINE HOLD Y                 CALL TRANSFER N
PRIVACY N                   CODE CALL N
MULTI BUTTON SET CAP Y      ROUTE SEL N
FLAT RATE N                 CALL PICK UP Y
INDIVIDUAL LINE Y           CALL WAITING Y
RESTRICTED LINE N           CALL FORWARDING N
```

FIG. 6

```
                   ┌─ 602
              SET No. 62
              TYPE 6

BUTTON    TELEPHONE    MAN.      RING SEL
 No.         No.       EXCL       CODE

1 CW         ―          ―          ―
2 CPU       6220        Y         NOR
3 CPU       6221        N         NOR
4 LH         ―          ―          ―
5 ―          ―          ―          ―
6 ―          ―          ―          ―
```

FIG. 7

```
                    ┌─603
           RING SEL CODE DEL
           CONF GROUP 11109

SET No. 62                  MESSAGE RATE Y
LINE CLASS CODE CENTREX     INTERCEPT Y
ORIGINATING EQ No. 1E3,1E4  GROUND START Y
LINE HOLD Y                 CALL TRANSFER Y
PRIVACY N                   CODE CALL N
MULTI BUTTON SET CAP Y      ROUTE SEL Y
FLAT RATE N                 CALL PICK UP Y
INDIVIDUAL LINE Y           CALL WAITING N
RESTRICTED LINE N           CALL FORWARDING N
```

FIG. 8

```
                    ┌─604
              SET No. 62
               TYPE 6

BUTTON    TELEPHONE    MAN.      RING SEL
 No.         No.       EXCL       CODE

1 CPU        6220       Y         DEL
2 CPU        6221       N         DEL
3 CW         ___        _         ___
4 RS         ___        _         ___
5 LH         ___        _         ___
6 CT         ___        _         ___
```

KEY TELEPHONE MANAGEMENT SYSTEM

TECHNICAL FIELD

The invention relates to apparatus and method for enabling telephone customers to control and implement combinations of button and line feature changes for telephone sets of customer key telephone systems.

BACKGROUND AND PROBLEM

Telephone customers oftentimes have key telephone equipment that enables the customer to have multiple telephone lines appear on a telephone set so that the customer using the telephone set may originate or answer a telephone call on any telephone line. In other telephone set configurations, the customer may have various telephone lines coupled with all or selected ones of the telephone sets. In addition, the customer may also want telephone lines to have various line features, such as call forwarding, call waiting, call transfer, ring selection and others, that are available at a telephone switching system serving the customer telephone lines. A customer may also request that various ones of the customer telephone sets be equipped with buttons that provide button features, such as privacy, speed calling, call hold and others. Such customer key telephone systems may comprise a combination of non-button and single, six, ten, thirty or more button key telephone sets.

A customer may, from time to time, want to add or remove telephone lines coupled with various key telephone sets. In addition, a customer may also want to add or delete line features to various ones of the telephone lines and to add, delete or rearrange various button and line features associated with each button of the customer's key telephone sets. Systems interconnected with telephone switching systems are available for use in enabling customers to add, delete and change telephone line features for a given customer telephone line. Telephone line features are available at a telephone switching system and are associated with telephone lines. These systems typically provide a data base customized for each customer and contain information about telephone line features available for customer use and which the customer can access to add, delete and change telephone line features for the customer telephone lines. A problem arises in that although a customer may change telephone line features, the customer must contact the local telephone company and place an order requesting the telephone company to install button features that are associated with each customer key telephone set rather than the customer telephone line thereby causing a delay in time when the button features are available for customer use. The telephone company responds to the customer's order by preparing a service order which is sent to and instructs the telephone switching system maintenance force to install the ordered button features for the customer's use.

SOLUTION

The foregoing problem is solved and the public telephone network is enhanced by a key telephone management controller and a method of operation thereof for enabling telephone customers to control and implement both button and line changes to customer key telephone systems served by a telephone switching system. The controller apparatus is coupled with telephone switching systems serving customer key telephone systems and comprises data base structure for recording combinations of customer-defined key telephone button and line features provided by the telephone switching system serving the customer telephone lines. Controller apparatus, in interaction with telephone customers, enable the customers to select ones of recorded key telephone button and line features and control the telephone switching system to assign both customer selected button and line features to each telephone set of the customer key telephone system.

The key telephone management controller, connectable with telephone switching systems, comprises structure for recording customer data base records defining button and line features selected by a telephone customer for use by customer key telephone systems. A plurality of customer-selectable pattern configurations defining ones of the recorded button and line features is recorded for each customer telephone set. The key telephone management controller, in interaction with the customer, enables the customer to select and display at a customer terminal ones of the recorded pattern configurations and to add thereto and delete therefrom both button and line features for each customer telephone set. Customer-generated changes are encoded into telephone switch code messages and transmitted to the telephone switching system serving the customer to control the telephone switching system to implement the customer charges.

DETAILED DESCRIPTION

Figure 1:
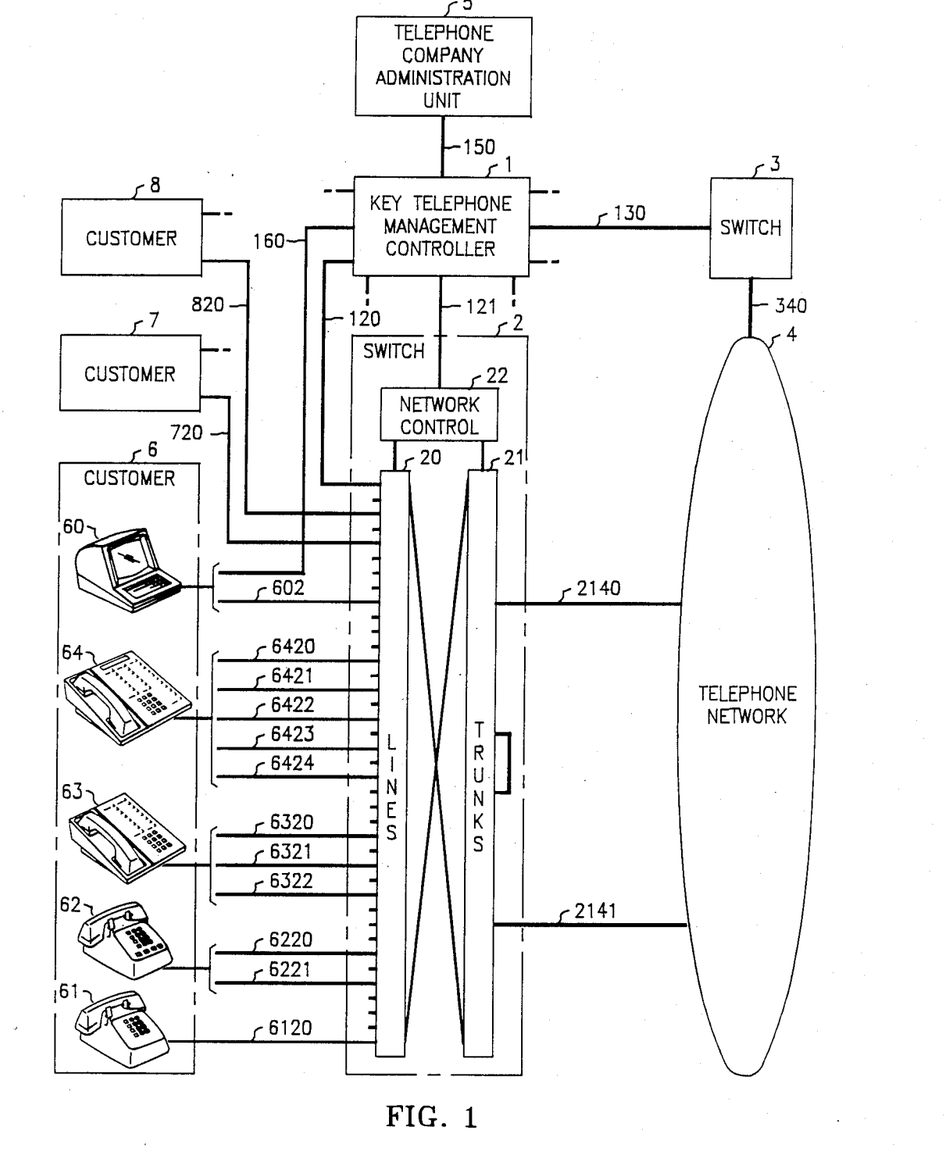
FIG. 1 is a diagram of a telephone network interconnected with a key telephone management controller embodying the principles of the invention.

Key telephone management controller 1, FIG. 1, enables telephone customers 6, 7 and 8 served by telephone switching systems, such as telephone switching system 2, to control and implement changes to customer key telephone systems served by telephone switching system 2. Telephone switching system 2 may be any of a number of well known types of telephone switching systems, such as an AT&T 5ESS TM switching system, wherein switch code instructions stored in network control 22 enable network control 22 to interconnect line equipment 20 and trunk equipment 21 so as to selectively interconnect customer telephone lines and connect customer telephone lines with trunks 2140, 2141 of telephone network 4.

Telephone switching system 2 is intended to provide a customer service, such as Centrex, wherein telephone customers 6, 7 and 8 may subscribe to key telephone services provided by telephone switching system 2. A telephone customer served by telephone switching system 2, such as customer 6, may have key telephone systems with each system having multi-button telephone sets coupled with line and trunk equipment 20, 21 of telephone switching system 2. A customer 6, 7 and 8 subscribing to key telephone services may have various combinations of non-button and button telephone sets. With key telephone service, a telephone customer served by telephone switching system 2, such as customer 6, may have key telephone systems with each system having multi-button telephone sets coupled with line and trunk equipment 20, 21 of telephone switching system 2. A typical key telephone system may have various combinations of button telephone sets, such as a 30-button telephone set 64, a 10-button telephone set 63 and a 6-button telephone set 62, and a regular telephone set 61 which does not have buttons but which can be provided with certain key telephone system features.

Each of the customer key telephone sets are connected by telephone lines with telephone switching system 2. For example, 30-button key telephone set 64 may be coupled by 5 telephone lines 6420, 6421, 6422, 6423 and 6424 with line equipment 20 and 10-button telephone set 63 coupled by 3 telephone lines 6320, 6321 and 6322 with line equipment 20. Similarly, 6-button telephone set 62 may be coupled by 2 telephone lines 6220 and 6221 and non-button telephone set 61 by telephone line 6120 with line equipment 20. It is to be understood, although not shown in the drawing, that each key telephone, with the exception of non-button telephone set 61, may be coupled by more or fewer telephone lines with telephone switching system 2 and each may, in some circumstances, be coupled with trunk equipment 21.

Telephone switching system 2 is arranged so that various button and line features may be assigned to both customer key telephone sets 61, 62, 63 and 64 and the telephone lines coupled therewith. Some examples of the line features that may be available may be a flat rate (FR) and message rate (MR) class of service wherein a customer may elect to lease a telephone line by paying a flat monthly fee or a fee for each call made on the telephone line, respectively. A customer may also elect to lease an individual (IL), a party (PR) or a restricted (RL) telephone line. In addition, a customer may, depending upon the type of customer telephone sets, wish to have a ground (GS) or loop (LS) start telephone line. A telephone line serving a key telephone customer may also have a call transfer (CT) feature wherein telephone calls may be transferred to other telephone lines and a code calling (CC) telephone line wherein telephone calls may be placed on a telephone line having this feature by dialing a special code. Key telephone customers may also elect to have particular telephone lines placed on intercept (I) when it is not convenient to answer telephone calls appearing on the telephone line. In addition, a key telephone customer may wish to have ring selection (RS) features assigned to various telephone lines, such as having an incoming local telephone call identified by a single ring signal and an incoming toll telephone call identified by multiple ring signals. The ringing signal may, at the customer's option, be normal (NOR) or delayed (DEL).

Telephone switching system 2 is also arranged to provide key telephone customers special button features wherein a button feature may be assigned to a button of the customer key telephone set. For example, a call back (CB) feature may be assigned to a button of a key telephone set so that a customer having dialed a busy telephone number may operate the button of the key telephone set so that subsequent telephone calls may be generated to the busy telephone number. A customer may elect to have interconnect (IC) and speed calling (SC) button features wherein a customer may operate the (IC) button to connect to a special telephone line or the (SC) button so that by dialing a predetermined abbreviated telephone number the customer can be connected with the telephone line identified by the telephone number. Call hold (CH) and line hold (LH) button features are available so that a key telephone customer may operate a button of a key telephone set to place an incoming telephone call or a telephone line coupled with the key telephone set on hold.

Telephone switching system 2 also provides some features that are common to both telephone lines and buttons. For example, a route selection (RS) feature may be assigned both to a button and a telephone line appearing on a key telephone set. Operation of the button assigned the (RS) feature enables the customer to place telephone calls over the telephone line associated with the (RS) feature on routes defined by the (RS) feature. Each telephone line coupled with a key telephone set has associated therewith a call pick up (CPU) line and button feature that enables a customer to select the telephone line by operating the key telephone set button. Similarly, a key telephone set assigned a call forwarding (CF) button enables a customer to forward a telephone call incoming over the telephone line having the (CF) feature to another telephone line. The button and telephone line call waiting (CW) and privacy (P) features enable a customer to indicate to a called telephone station that a call is waiting and to insure privacy on a customer telephone call, respectively. These are only some of the button and telephone line features that may be offered to key telephone customers, and it is to be understood that many additional key telephone features can be offered by telephone switching systems, such as telephone switching system 2, within the teaching of the invention.

Telephone switching system 2 is coupled by data link 121 with key telephone management controller 1 which in turn is coupled by data links 130 with other telephone switching systems 3 and by data links, such as data link 160, with key telephone customers 6, 7 and 8. Key telephone management controller 1 is coupled by data link 150 with a telephone company administration unit 5 that controls the operation and administration thereof. Key telephone management controller 1, FIG. 2, comprises a processor that may be a computer, such as an AT&T 3B15 or 3B20 simplex or duplex computer. Such computers need not be described in detail for an understanding of the invention and in general have a central processing unit 10, memory unit 11 and an interface unit 12 each connected by address, data and control leads to a central bus 13. Interface unit 12 couples data links 150, 160, 120, 121 and 130, extending to telephone company administration unit 5, key telephone customers 6, 7 and 8 and with telephone switching systems 2 and 3 and with bus 13, so that data may be exchanged with key telephone management controller central processing unit 10 and memory unit 11. Computer terminal 14, which may be any one of a number of well-known computer terminals or personal computers, is coupled to interface unit 12 so that data may be entered into central processing unit 10 and memory unit 11 by input device 140 and read therefrom by use of output device 141. Computer terminal 60, FIG. 1, which may be a personal computer terminal or other computer terminal similar to computer terminal 14, is located at customers 6, 7, and 8 and at telephone company administration unit 5 for use in exchanging data with key telephone management controller 1.

In the embodiment of the invention, customer 6 informs telephone company administration unit 5 that the customer would like to subscribe to the key management service offered by the telephone company and the customer would like to implement and control button and line features for customer key telephone systems. Telephone company administration unit 5 is also informed that customer 6 would like to lease eleven telephone lines for use by customer telephone sets 61, 62, 63 and 64 and that the customer presently has 6, 10 and 30-button sets 62, 63 and 64 and a non-button telephone set 61. Telephone company administration unit 5 is also informed that customer 6 would like to subscribe to the call transfer (CT), code call (CC), flat rate (FR), ground start (GS), individual line (IL), intercept (I), message rate (MR), restricted line (RL), and ring selection codes (RSC) line features. In addition, customer 6 would also like to subscribe to the line hold (LH) button feature and to the combined button and line hold features of call pick up (CPU), call forward (CF), call waiting (CW) and privacy (P).

Figure 2:
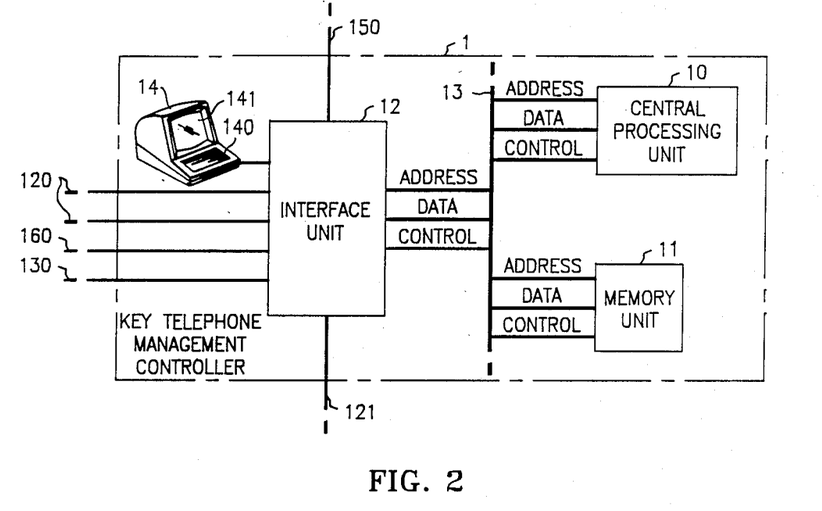
FIG. 2 illustrates the functional apparatus relationship of the key telephone management controller set forth in FIG. 1.
Figure 5:
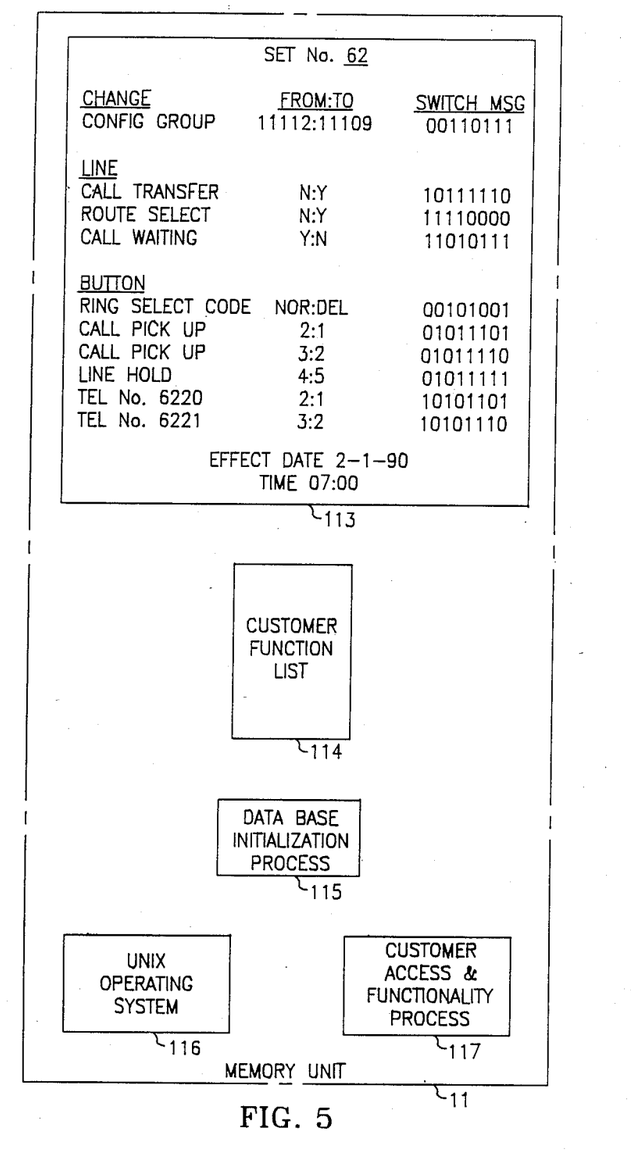

The central processing unit 10, FIG. 2, of key telephone management controller 1 has an operating system, such as the well-known UNIX ® operating system 116, FIG. 5, to control the operation thereof. Application software, such as customer function list 114, data base initialization process 115 and customer access and functionality 117, is stored in memory unit 11, FIG. 2. Such application software need not be described in detail for an understanding of the invention but sufficient to say that customer function list 114, FIG. 5, is a list of button and line features that have been ordered by the customer and are available for the customer's use. Data base initialization process 115 may be any one of a number of data base initialization processes that enables central processing unit 10 to initially establish customer data base records in memory unit 11. Customer access and functionality process 117 may also be any one of a number of well-known application processes that enable a user, such as customer 6, FIG. 1, to access and control central processing unit 10.

After receipt of customer 6 initial request, telephone company administration unit 5, accesses key telephone management controller 1 over data link 150 to activate data base initialization process 115. In the operation thereof, FIG. 3, telephone company administration unit 5 sets up a customer feature data base 110 having a plurality of records 11061 through 11064 wherein each record defines button and line features initially selected by customer 6 for use by associated telephone sets 61 through 64 of the customer key telephone system.

Each customer feature record records the telephone button and line features selected by the customer from the button and line features available for use by the customer for each telephone set. For example, record 11062, established for 6-button customer telephone set 62, identifies the customer telephone set 62 as a multibutton set and is initially assigned customer pattern configuration 11112. In addition, 6-button telephone set 62 initially has a button feature of line hold (LH), line features of ground start (GS), individual line (IL), intercept (I), message rate (MR), ring selection code (RSC) and combined button and lines features of call pick up (CPU) and call waiting (CW). Telephone set 62 is also assigned a line class code (CENTREX) and originating equipment (OE) 1E3 and 1E4 of serving telephone switching system 2 for telephone lines 6220 and 6221 coupled with line equipment 20.

Telephone company administration unit 5 also establishes a customer pattern configuration data base 111 wherein is located a plurality of customer-selectable pattern configurations defining button and line features available for each telephone set of the customer key telephone system. For example, customer 6 button telephone set 62 may have four selectable pattern configurations 11109 through 11112 each defining a particular pattern configuration that may be selected by customer 6 for 6-button telephone set 62. In accordance with the principles of the invention, customer 6 may request telephone company administration unit 5, FIG. 1, to record initial pattern configurations for each customer telephone set 61 through 64. A recorded customer pattern configuration data base record, for example pattern configuration 11112, FIG. 3, for 6-button telephone set 62, may record that button features call waiting (CW) and line hold (LH) are assigned to buttons 1 and 4, respectively, and combined button and line feature call pick up (CPU) is assigned to buttons 2 and 3. Another customer-selectable pattern configuration 11109 for 6-button telephone sets may record that combined button and line feature call pick up (CPU) is assigned to buttons 1 and 2 and that button features call waiting (CW) and line features of route selection (RS), line hold (LH), and call transfer (CT) are assigned, respectively, to buttons 3, 4, 5 and 6. Instead of preparing individual customer pattern configurations, telephone company administration unit 5 may initialize a plurality of blank customer pattern configurations 111 for each of the customer telephone sets 61 through 64 wherein customer 6 may prepare customer pattern configurations, such as 11109 through 11112, for each telephone set of the customer key telephone system. In addition to 6-button telephone set 62, customer pattern configurations are initialized for each type of customer button telephone set. For example, a plurality of customer pattern configurations 11101 through 11104 may be recorded, any of which may be used for one or several of the customer 30-button telephone sets 64. Similarly, customer pattern configurations 11105 through 11108 are established for customer 10-button telephone sets.

Figure 4:
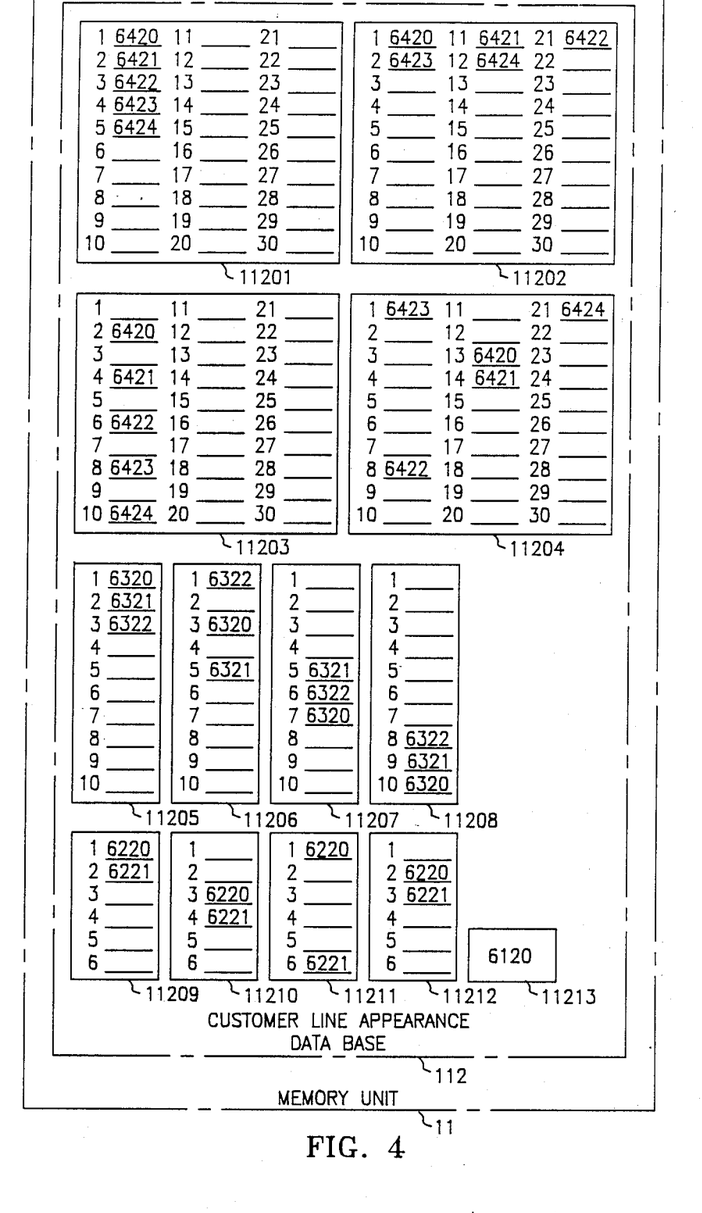

In addition to customer pattern configuration data base 111, another data base 112, FIG. 4, is set up for recording a plurality of customer-selectable line appearance pattern configurations defining telephone line appearances for customer telephone sets 61 through 64. In the initial sequence, each of the records 11201 through 11213 may be set either by customer 6 or by telephone company administration unit 5 to record the appearance of a telephone line at a button appearance on a customer telephone set. The present embodiment of the invention assumes that customer 6 initially selected line appearance pattern configuration 11212 wherein 6-button telephone set 62, FIG. 1, has telephone lines 6220 and 6221 assigned to buttons 2 and 3, FIG. 4. Since non-button telephone set 61, FIG. 1, does not have buttons, line appearance pattern configuration 11213 records that telephone line 6120 is assigned to telephone set 61.

Customer 6, FIG. 1, having subscribed to the telephone company key telephone management service has computer terminal 60 interconnected by telephone line 602 with line equipment 20 of telephone switching system 2 and by a data link 160 with key telephone management controller 1. Customer 6 accesses key telephone manager controller 1 directly over data link 160 or over telephone lines 602 and 120, via telephone switching system 2, to establish a communication path with central processing unit 10, FIG. 2, via interface unit 12 and data bus 13. Key telephone management controller central processing unit 10, under control of customer access and functionality process 117, FIG. 5, resident in memory unit 11 and interactive with customer 6, enables customer 6 to control and implement changes to the customer telephone sets.

Figure 6:
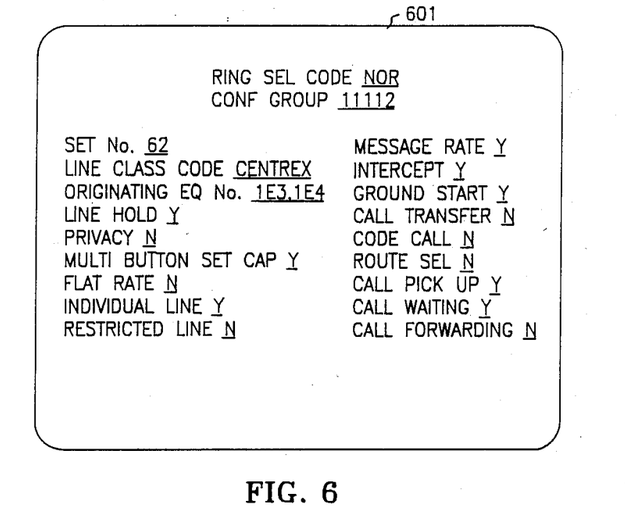
FIGS. 6 through 9 illustrate screen presentations of button and line features selected by a customer for assignment to a representative key telephone set of FIG. 1.

Upon establishing a data connection with key telephone management controller 1, a menu is displayed on a CRT display device of customer computer terminal 60, FIG. 1. Customer 6 enters the identity of a specific telephone set, for example telephone set 62, thereby enabling key telephone management controller 1 to display customer feature data base record 11062 recorded in memory unit 11. Customer computer terminal 60 is controlled to display customer data base record 11062 in format 601, FIG. 6, showing the button and line features currently assigned to telephone set 62. Initially, telephone set 62 is assigned line class code CENTREX and originating equipment number 1E3, 1E4. Telephone set 62 also is assigned button feature line hold (LH) and line features individual line (IL), message rate (MR), intercept (I) and ground start (GS). In addition, customer 6 has also selected combined button and line features call pick up (CPU) and call waiting (CW). The displayed format 601 also informs customer 6 that telephone set 62 has multi-button set capability (MBSC), a ring select code (RSC) normal (NOR) and is assigned line appearance pattern configuration 11112, FIG. 4.

Figure 3:
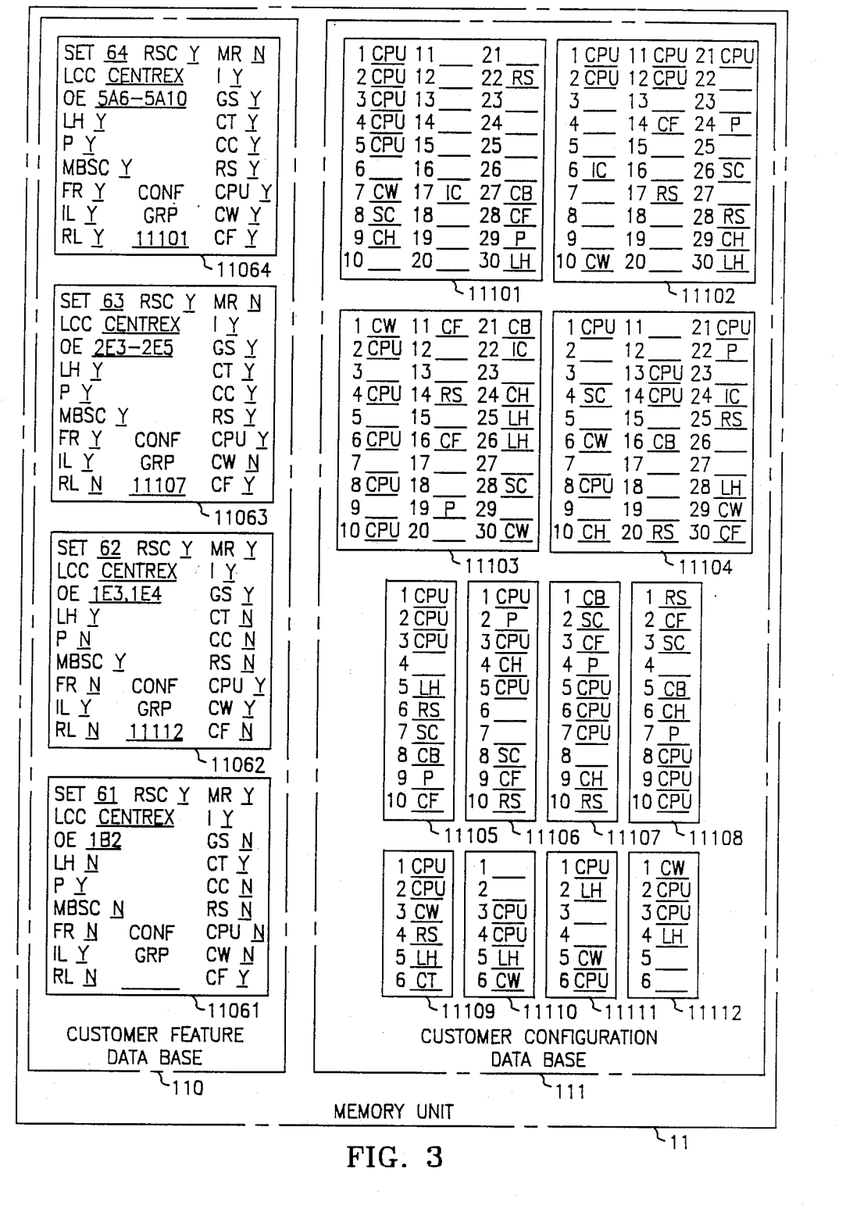
FIGS. 3 through 5 sets forth an illustrative sections of data bases in the memory unit of the key telephone management controller set forth in FIGS. 1 and 2 defining button and line features available for use by a customer.
Figure 7:
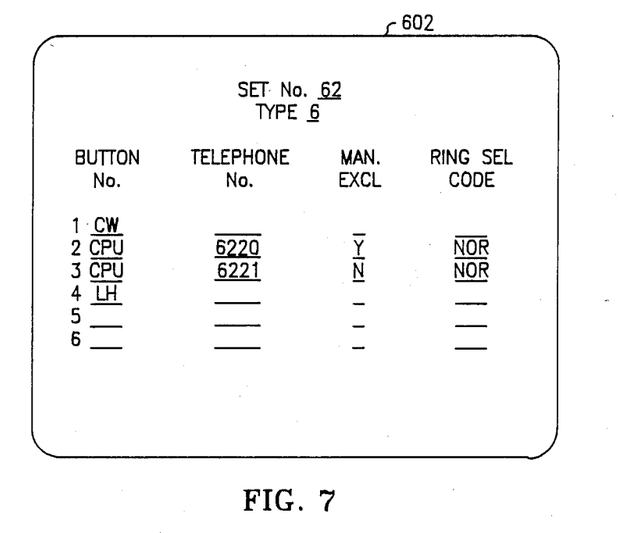

Customer 6, FIG. 1, may, by menu selection, enable key telephone management controller 1 to display combined button pattern configuration 11112, FIG. 3, and line appearance pattern configuration 11212, FIG. 4, information at computer terminal 60 in format 602, FIG. 7. Displayed format 602 informs customer 6 that telephone set 62 is a type 6-button telephone set and that button feature line hold (LH) is currently assigned to button position 4. Displayed format 602 also indicates to customer 6 that telephone lines 6220 and 6221 are assigned, respectively, to button positions 2 and 3 and that these telephone lines may be accessed and answered by combined button and line feature call pick up (CPU), also assigned button positions 2 and 3. Customer 6 is also informed that manual exclusion is available on telephone line 6220 and that both telephone lines 6220, 6221 are currently assigned a normal ring select code. In addition, display format 602 also shows that combined button and line feature call waiting (CW) is assigned button position 1.

Figure 8:
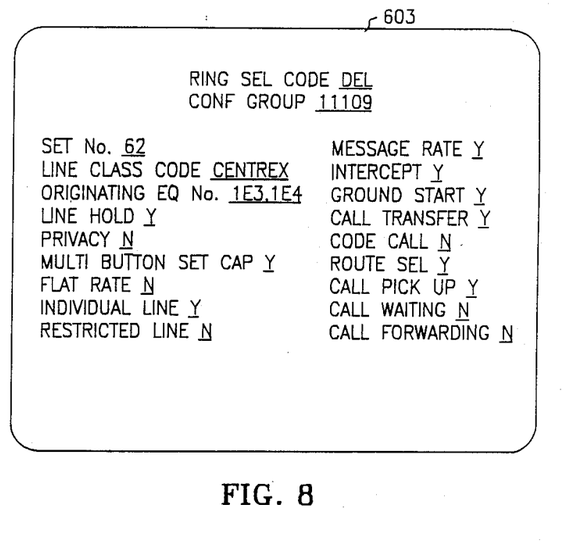
Figure 9:
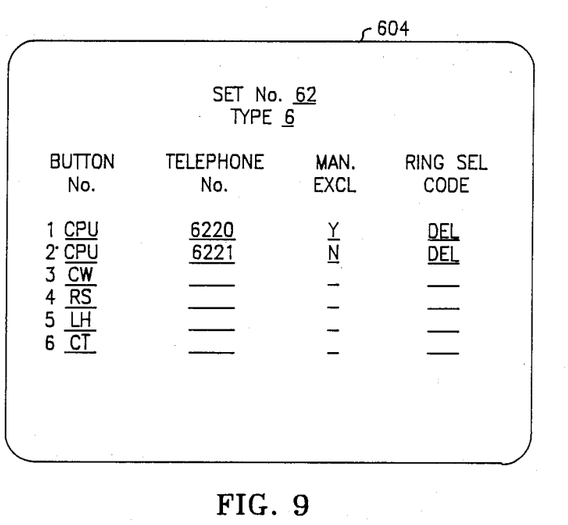

Customer 6, wishing to implement line and button feature changes in the station configuration for telephone set 62, enters the desired changes into format 601, FIG. 6. For example, customer 6 may want to add button feature call transfer (CT), combined button and line features route selection (RS) and remove call waiting (CW) and to have these assigned to telephone set 62 in accordance with customer pattern configuration 11109, FIG. 3, and as displayed in format 603, FIG. 8. Customer selection of call pattern configuration 11109 assigns call pick up (CPU) features to telephone set buttons 1 and 2 and route selection (RS), line hold (LH) and call transfer (CT) features, respectively, to buttons 4 through 6. Using computer terminal 60, customer 6 accesses format 604, FIG. 9, and assigns telephone lines 6220 and 6221 to buttons 1 and 2, respectively, so that operation of call pick up (CPU) buttons 1 and 2 on telephone set 62 allows a user of telephone set 62 to originate and answer telephone calls on telephone lines 6220 and 6221.

Key telephone manager controller 1 determines the telephone language switch codes that are required by telephone switching system 2 serving the customer telephone lines to control telephone switching system 2 to implement the button and line features selected by customer 6. Thus, for customer key telephone set 62, central processing unit 10, FIG. 2, encodes the customer request for change from button and line pattern configuration 11112 to 11109 into a pending data base 113 recorded in memory unit 11. Similarly, other customer initiated changes, such as selecting call transfer (CT), route select (RS) and changes of button positions from one button position to another, are recorded in pending data base record 113. Pending data base record 113 is encoded into telephone switch code messages, such as binary number 00110111, and transmitted over data link 121, FIG. 1, to network control 22 of telephone switching system 2. Network control 22 implements the customer changes at the date and time indicated by customer 6 for telephone set 62. Customer 6 may, by the use of key telephone management controller 1, control and implement both button and line feature changes and station change configurations for each telephone set 61 through 64 of the customer key telephone systems.

The method of operating key telephone management controller 1, FIG. 1, enables a customer to control and implement changes to customer key telephone systems served by telephone switching system 2. In operation, key telephone management controller 1 records data base records of customer-selected telephone line and button features for each telephone set of the customer key telephone systems. A customer, such as customer 6, contacts telephone company administration unit 5 and requests key telephone management capability for each of the customer key telephone systems, FIG. 10, step 1300. Customer 6 selects, in consultation with telephone company administration unit 5, step 1301, various ones of button and line features that are available at telephone switching system 2 for use with customer key telephone systems. The customer-selected button and line features is entered into key telephone management controller 1, step 1302, as a customer function list 114, FIG. 5.

Figure 10:
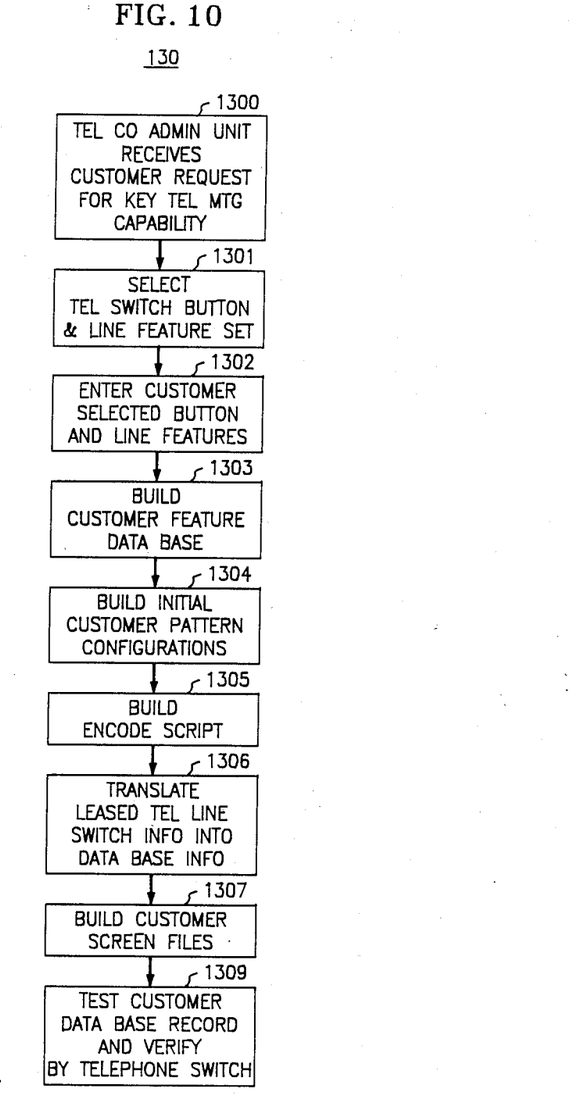
FIGS. 10 through 12 illustrate flow charts of the operation of key telephone management controller 1 set forth in FIGS. 1 and 2 in accordance with the principles of the invention.

Central processing unit 10, FIG. 2, of key telephone management controller 1 operating under control of data base initialization process 115, FIG. 5, establishes a customer feature data base 110 in memory unit 11 for customer 6, FIG. 3, and builds customer feature data base records 11061 through 11064 for each telephone set of the customer key telephone system, FIG. 10, step 1303. In addition, central processing unit 10, step 1304, builds an initial customer pattern configuration data base 111, FIG. 3, in memory unit 11 by recording a plurality of customer-selectable button and line pattern configuration records 11101 through 11112 for each telephone set of the customer key telephone system. Interacting with telephone switching system 2 and telephone company administration unit 5, central processing unit 10, step 1305, builds encode script which enables key telephone management controller 1 to construct telephone switch code messages, FIG. 5, herein represented as binary code messages, which control telephone switching system 2 to assign the customer-selected line and button features to the customer telephone sets.

Key telephone management controller 1 also translates, FIG. 10, step 1306, the customer telephone line information recorded in telephone switching system 2 for telephone lines 6120, 6220 and 6221, 6320 through 6322, and 6420 through 6424, FIG. 1, into a plurality of initial customer line appearance pattern configuration data base records 11201 through 11213, FIG. 4, for each customer telephone set. Customer screen files, step 1307, are recorded for the type of customer computer terminal 60, FIG. 1, and recorded in customer access and functionality process record 117, FIG. 5, of memory unit 11. The newly-established customer data base records, step 1309, are tested and recorded upon verification by telephone switching unit 2.

Key telephone management controller 1 displays ones of the data base records illustrating line and button features selected by the customer at customer computer terminal 60 for each customer telephone set and enables customer 6 to implement changes of line and button features for each customer telephone set of the customer key telephone systems. Customer 6, wishing to implement line and button changes for telephone set 62, accesses key telephone management controller 1, FIG. 11, step 1600, by initiating a data connection with key telephone management controller 1, FIG. 1, from customer terminal 60 via data link 160 or by telephone lines 602 and 120 through telephone switching system 2.

Figure 11:
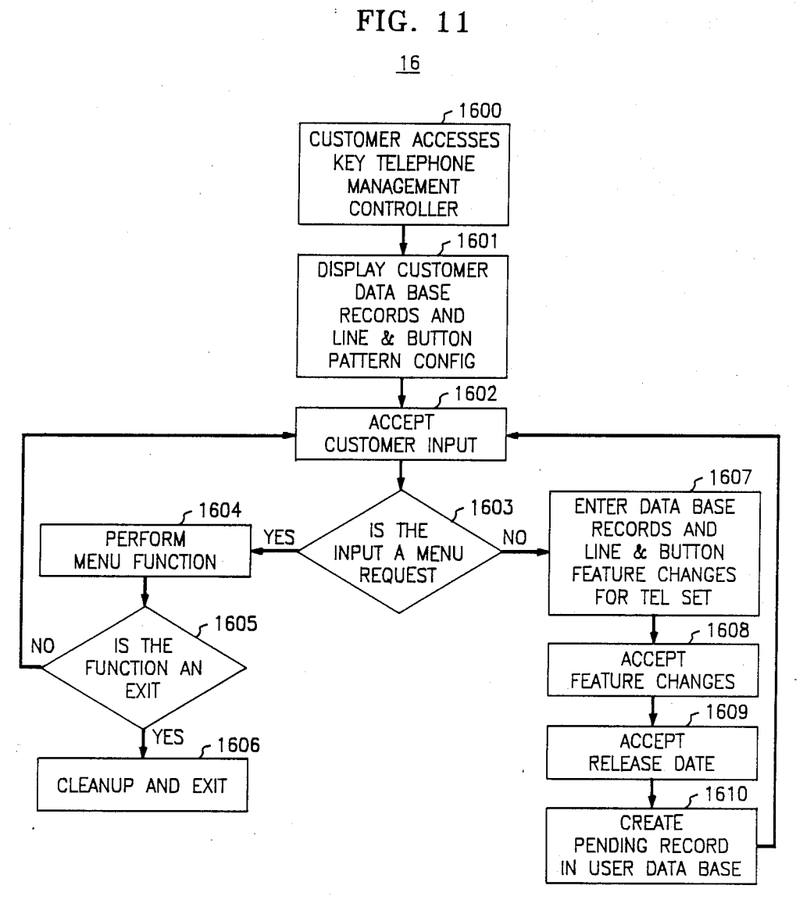

Computer terminal 60, under control of key telephone management controller 1, displays a menu enabling customer 6, FIG. 11, step 1601, to select customer data base records and line and button pattern configurations of customer telephone sets 61 through 64. Computer terminal 60, steps 1602 and 1603, accepts data input from customer 6, and if the data input is a menu function, step 1604, the menu may indicate help, insert changes in previously-selected line and button features, delete pending line and button features, expand display fields, abort the request, exit or explain other functions of the key telephone management service available to customer 6. If the menu exit function has been selected by customer 6, steps 1605 and 1606, central processing unit 10 of key management controller 1 cleans up the files and exits. On other selected menu functions, central processing unit 10 performs the selected menu function and returns to accept additional data input from customer 6, steps 1605 and 1602.

Customer 6, wishing to implement changes to the line and button features currently assigned to telephone set 62, steps 1603 and 1607, selects data base record display 601, FIG. 6, or combined line and button and leased telephone line pattern configurations display 602 and enters the desired changes to be implemented for telephone set 62. Key telephone management controller 60 central processor unit 10, steps 1608, 1609 and 1610, accepts the customer-entered feature changes, along with the date and time that the customer desires the changes to be implemented, for telephone set 62 and creates a pending data base record 113, FIG. 5, recording changes generated by customer 6. Central processing unit 10 returns to accept additional customer input data, FIG. 11, step 1602, and if there is no additional input data, exits, step 1603 through 1606, customer access and functionality process 117, FIG. 5.

Figure 12:
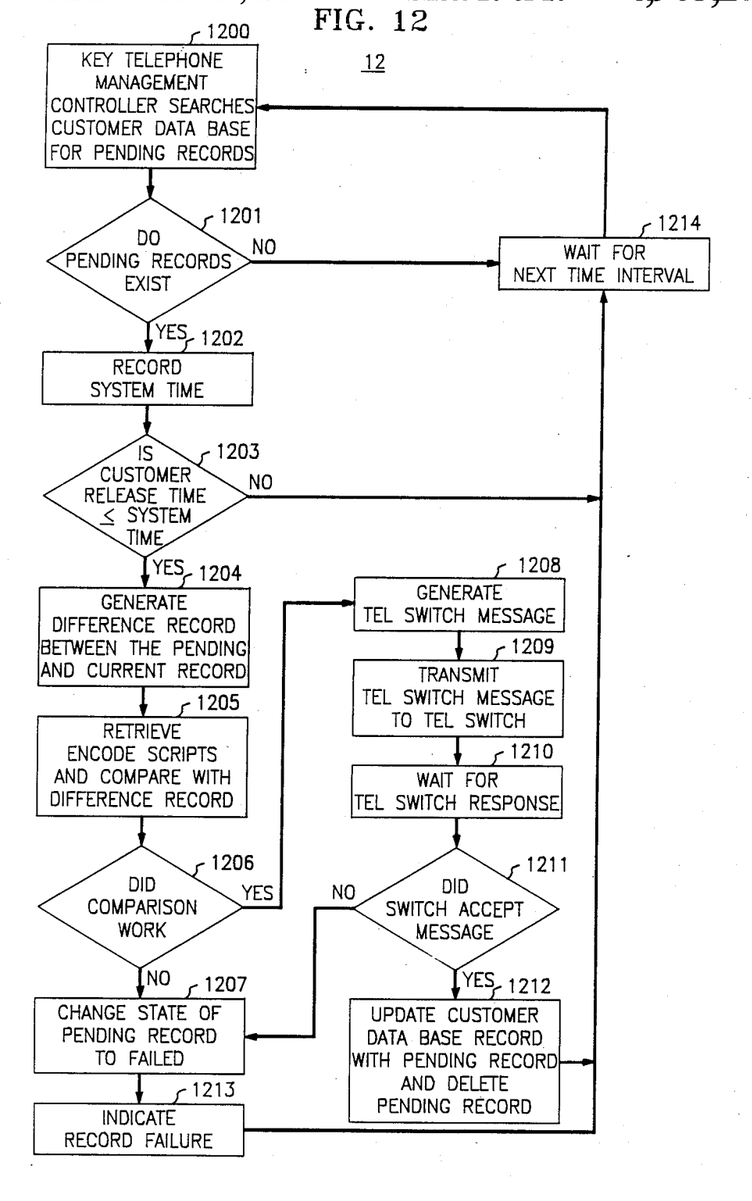

Central processing unit 10 of key telephone management controller 1 initiates periodic searches of memory unit 11, FIG. 12, to identify customer pending data base records, step 1200. If the customer 6 does not have any pending records, step 1201, central processing unit 10 waits for a predetermined interval of time, step 1214, and repeats the search sequence, step 1200. When it is determined that customer 6 has pending records, step 1201, central processing unit 10 records the current system time, steps 1202 and 1203, and determines whether the customer-specified date and time that the pending record are to be activated is equal to or less than the current system time. When the customer-specified time of activation is greater than the current system time, central processing unit 10, steps 1203, 1214, and 1200, repeats the search sequence after a predetermined interval of time.

When the system time indicates that it is time to activate the pending customer record, central processing unit 10, step 1204, generates a difference record between the pending and current data base records for customer 6. The encode scripts are retrieved, step 1205, and compared with the difference record. If the comparison did not work, step 1206, central processing unit 10 changes the state of the pending record to failed, step 1207, indicates record failure, step 1213, and waits for the next time interval.

Upon a successful comparison, step 1206, central processing unit 10 generates the telephone switching system switch code messages required to control telephone switching system 2 serving customer 6, step 1208, to implement the customer-selected line and button features for telephone set 62 and transmits the assembled telephone switch code messages to telephone switching system 2, step 1209. Central processing unit 10, step 1210, then waits for a response from telephone switching system 2, indicating as to whether the telephone switch code messages have been accepted or if the messages failed. If the transmitted telephone switch code messages are accepted by telephone switching system 2, step 1211, central processing unit 10 updates the customer data base records with the pending record information, step 1212, and waits for the next interval of time, step 1214. Should telephone switching system 2, step 1211, fail to accept the transmitted telephone switch code messages, central processing unit 10, step 1207, changes the state of the pending record to failed, indicates record failure and returns to wait for the next interval of time, steps 1213 and 1214.

Thus, key telephone management controller 1 enables telephone customers, such as customer 6, to select and implement telephone line and button changes for each telephone set of the customer key telephone systems at the option of the customer.

We claim:

1. A management controller for controlling and implementing changes to customer key telephone systems served by a telephone switching system wherein said management controller comprises means coupled with the telephone switching system for recording both telephone customer-defined key telephone button and line features provided by the telephone switching system, and means interactive with customers for enabling a customer to select both ones of the recorded key telephone button and line features and for controlling the telephone switching system to assign the customer-selected button and line features to telephone sets of a customer key telephone system.

2. The management controller set forth in claim 1 wherein said recording means comprises
   data base means for recording customer data base records defining telephone button and line features selected by the customer as available for use by the customer key telephone system.

3. The management controller set forth in claim 2 wherein said customer enabling and controlling means comprises
   data base means for recording a plurality of customer-selectable pattern configurations defining button and line features for telephone sets of the customer key telephone system.

4. The management controller set forth in claim 3 wherein said customer enabling and controlling means comprises
   data base means for recording a plurality of customer-selectable pattern configurations defining telephone line appearances for telephone sets of the customer key telephone system.

5. The management controller set forth in claim 4 wherein said customer enabling and controlling means comprises
   means interactive with the customer for enabling the customer to select one of said data base defined button and line feature pattern configurations for each telephone set of the customer key telephone system.

6. The management controller set forth in claim 5 wherein said customer enabling and controlling means comprises
   means interactive with the customer for enabling the customer to select one of said recorded telephone line appearance pattern configurations for each customer telephone set and assign ones of the customer telephone lines to telephone line appearances set forth therein.

7. The management controller set forth in claim 6 wherein said customer enabling and controlling means comprises
   means interactive with the customer for enabling the customer to select ones of said defined button and line features pattern configurations and delete ones of the button and line features recorded therein and add ones of the button and line features recorded in the customer data base records of selected telephone button and line features.

8. The management controller set forth in claim 7 wherein said customer enabling and controlling means comprises
   means responsive to selected ones of said recorded telephone line appearance and said defined button and line features data base pattern configurations for encoding customer-generated changes therein into telephone switch code messages and transmitting said encoded messages to the telephone switching system serving the key telephone customer to control the telephone switching to implement changes initiated by the customer.

9. The management controller set forth in claim 8 wherein said customer enabling and controlling means comprises
   means for displaying said recorded customer data base records defining button and line features available for selection by the customer and ones of said defined button and line feature pattern configurations in combination with ones of said recorded telephone line appearance pattern configurations for each customer telephone set selected by the customer, and
   means for enabling the customer to modify each of said displayed button and line data base records and pattern configurations to control and implement changes to each telephone set of the customer key telephone system.

10. A management controller connectable with telephone switching systems for controlling and implementing changes to customer key telephone systems served by the telephone switching systems wherein said management controller comprises
    means for recording customer data base records defining combinations of button and line features selected by a telephone customer for use by a customer key telephone system, and
    means interactive with the telephone customer for adding and deleting ones of said recorded customer-selected button and line features into and from data base pattern configurations associated with each telephone set of the customer key telephone system and for controlling a telephone switching system serving the telephone customer and interconnected with said management controller to implement said customer-selected button and line features for each customer telephone set of the customer key telephone system.

11. The management controller set forth in claim 10 wherein said management controller comprises
    means for displaying ones of said recorded button and line feature data base records and said data base pattern configurations at a telephone customer display terminal for each customer telephone set selected by the telephone customer,
    means for enabling the telephone customer to modify button and line features of each customer telephone set by adding to and deleting button and line features set forth in said displayed data base records and pattern configurations, and
    means responsive to the telephone customer for designating date and time of activation of said button and line features additions and deletions for each selected telephone set.

12. A management controller connectable with telephone switching systems for controlling and implementing changes to customer key telephone systems served by ones of the telephone switching systems wherein said management controller comprises
    means for recording customer data base records defining combination of button and line features selected by a telephone customer as available for use by a customer key telephone system,
    means for recording a plurality of customer selectable pattern configurations defining ones of said recorded button and line features for each telephone set of the customer key telephone system,
    means interactive with the telephone customer for enabling the telephone customer to select and display at a customer terminal ones of said recorded telephone button and line features pattern configurations in combination with ones of said recorded telephone line appearance pattern configurations for each telephone set of the customer key telephone system, means interactive with the telephone customer for enabling the telephone customer to add and delete ones of said selected button and line features to the displayed button and line feature and telephone line appearance pattern configurations for each customer telephone set, and telephone system, and means for encoding customer-generated button and line features changes into telephone switch code messages and transmitting said encoded messages to the telephone switching system serving the customer key telephone system to control the telephone switching system to implement the changes initiated by the customer.

13. A method for implementing changes to customer key telephone systems served by a telephone switching system wherein said method comprises the steps of recording data base records of customer-selected button and line features for each telephone set of a customer key telephone system, and displaying at a customer terminal ones of the customer data base records illustrating combination of button and line features selected by the customer for each customer telephone set and responding to customer input defining changes of said displayed button and line feature by encoding said customer implemented changes of said button and line features into telephone switch code messages and transmitting said encoded telephone switch code messages to a telephone switching system for implementation to telephone lines coupled with the customer telephone sets.

14. The method for implementing key telephone changes set forth in claim 13 wherein said data base recording step comprises the step of recording a plurality of customer-selectable pattern configurations defining button and line features for each customer telephone set.

15. The method for implementing key telephone changes set forth in claim 14 wherein said data base recording step comprises the step of translating customer telephone line switch information into a plurality of customer line appearance pattern configurations for each customer telephone set.

16. The method for implementing key telephone changes set forth in claim 15 wherein said displaying and step comprises the steps of combining customer-selected ones of said button and line feature pattern configurations with ones of said customer line appearance pattern configurations corresponding to each customer telephone set and displaying said combined pattern configurations for a telephone set at the customer terminal, and accepting customer-generated changes to said displayed pattern configurations and creating a pending data base record recording said customer-generated changes.

17. The method for implementing key telephone changes set forth in claim 16 wherein said displaying step comprises the step of generating differences between said pending data base record and current ones of said button and line and said line appearance pattern configurations and encoding said differences into said telephone switch code messages.

18. A method for implementing changes to customer key telephone systems served by a telephone switching system wherein said method comprises the steps of recording data base records of line and button features selected by a customer for each telephone set of a customer key telephone system from a set of line and button features available at a telephone switching system serving the key telephone system, recording a plurality of customer-selectable pattern configurations defining button and line feature pattern configurations for each customer telephone set, translating customer telephone line switch information into a plurality of customer line appearance pattern configurations for each customer telephone set, combining customer-selected ones of said button and line feature pattern configurations with ones of said customer line appearance pattern configurations corresponding to a customer telephone set and displaying said combined pattern configurations at a customer terminal, accepting customer-generated changes to said displayed pattern configurations and creating a pending data base record recording said customer-generated changes, and generating differences between said pending data base record and current ones of said button and line and said line appearance pattern configurations and encoding said differences into telephone switch code messages transmitted to the telephone switching system for controlling the telephone switching system to implement and assign said customer-selected button and line features to the customer telephone set.

* * * * *